United States Patent
McCallum et al.

(10) Patent No.: US 10,524,131 B1
(45) Date of Patent: Dec. 31, 2019

(54) THWARTING RANGE EXTENSION ATTACKS

(71) Applicant: Red Hat, Inc., Raleigh, NC (US)

(72) Inventors: Nathaniel Philip McCallum, Raleigh, NC (US); Peter M. Jones, Boston, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/266,680

(22) Filed: Feb. 4, 2019

(51) Int. Cl.
H04W 12/10 (2009.01)
H04W 12/00 (2009.01)
H04W 12/12 (2009.01)
H04W 12/04 (2009.01)

(52) U.S. Cl.
CPC ... *H04W 12/1202* (2019.01); *H04W 12/0013* (2019.01); *H04W 12/00502* (2019.01); *H04W 12/0401* (2019.01); *H04W 12/04071* (2019.01); *H04W 12/1002* (2019.01); *H04W 12/1006* (2019.01)

(58) Field of Classification Search
CPC ....... H04W 12/12012; H04W 12/1006; H04W 12/00502; H04W 12/0401; H04W 12/04071; H04W 12/1002; H04W 12/0013
See application file for complete search history.

(56) References Cited

U.S. PATENT DOCUMENTS

| 8,522,349 | B2 | 8/2013 | Crume |
| 9,282,116 | B1 | 3/2016 | Rovniaguin |
| 9,762,610 | B1 | 9/2017 | Kwan et al. |
| 2004/0255167 | A1 | 12/2004 | Knight |
| 2007/0265043 | A1* | 11/2007 | Wang ...................... A63F 13/12 463/2 |
| 2016/0302028 | A1* | 10/2016 | Ling ........................ H04W 4/80 |
| 2018/0316606 | A1* | 11/2018 | Sung ...................... H04L 47/125 |

OTHER PUBLICATIONS

Author Unknown, "Preventing DoS Attacks for Layer 7 Traffic", F5 Networks, Inc., https://support.f5.com/kb/en-us/products/big-ip_asm/manuals/product/asm-implementations-11-5-0/1.html, 2017, 21 pages.
Chung, Antony, "Efficient Authentication in High Security Wireless Sensor Networks", https://www.tonychung.net/site/uploads/research/chung2011eah.pdf, Thesis, Lancaster University, Nov. 2011, 211 pages.
Jenkins, Steve, "Design Floating Pages using Large Fixed Background Images", https://www.gadgetdaily.xyz/design-floating-pages-using-large-fixed-background-images/, 2010, 13 pages.
O'Haver, Lora, "Four Strategies to Prevent Data Encryption From Hijacking Your Network", https://www.Informationsecuritybuzz.com/articles/four-strategies-prevent-data-encryption-hijacking-network/, Jul. 25, 2017, 9 pages.

* cited by examiner

*Primary Examiner* — Marisol Figueroa
(74) *Attorney, Agent, or Firm* — Haynes and Boone LLP

(57) ABSTRACT

A method includes, with a first computing system, sending a request over a network to a second computing system and receiving a response to the request over the network from the second computing system. The method further includes, with the first computing system, measuring a latency based on the request and the response, dividing the latency by a threshold value, resulting in a quotient, and determining whether to allow the second computing system to engage in secure communications with the first computing system.

19 Claims, 5 Drawing Sheets

THWARTING RANGE EXTENSION ATTACKS

BACKGROUND

The present disclosure relates generally to wireless computing systems, and more particularly, utilizing latency measurements to protect wireless communication systems from range extension attacks.

Computing systems often communicate with each other over networks. When doing so, sensitive data is often transmitted from one computing system to another. To avoid such sensitive data being compromised, transmissions over networks are often encrypted. Various encryption schemes may be used to encrypt sensitive data, such as public key cryptography. In public key cryptography, each endpoint for a communication session uses a public key and a private key. The private key is kept private while the public key can be sent freely to other endpoints. In some examples, two endpoints may use their own private key and each other's public key to create a shared key that can be used to encrypt data sent between them.

In addition to transmitting encrypted data over hardline networks, data is often transmitted over wireless networks. It is desirable to maintain security of the network in a wireless setting.

SUMMARY

According to one example, a method includes, sending, by a first computing system, a request over a network to a second computing system. The method further includes, receiving, by the first computing system, a response to the request over the network from the second computing system. The method further includes, measuring, by the first computing system, a latency based on the request and the response. The method further includes, dividing, by the first computing system, the latency by a threshold value, wherein the dividing results in a quotient. The method further includes, determining, based on the quotient, whether to allow the second computing system to engage in secure communications with the first computing system.

According to one example, a system includes a processor and a memory comprising machine readable instructions that when executed by the processor, cause the system to send, with a first computing system, a request over a network to a second computing system, receive, with the first computing system, a response to the request over the net-work from the second computing system, measure, with the first computing system, a latency based on the request and the response, divide, with the first computing system, the latency by a threshold value, wherein the dividing results in a quotient, and determine, based on the quotient, whether to allow the second computing system to engage in secure communications with the first computing system

Figure 1:
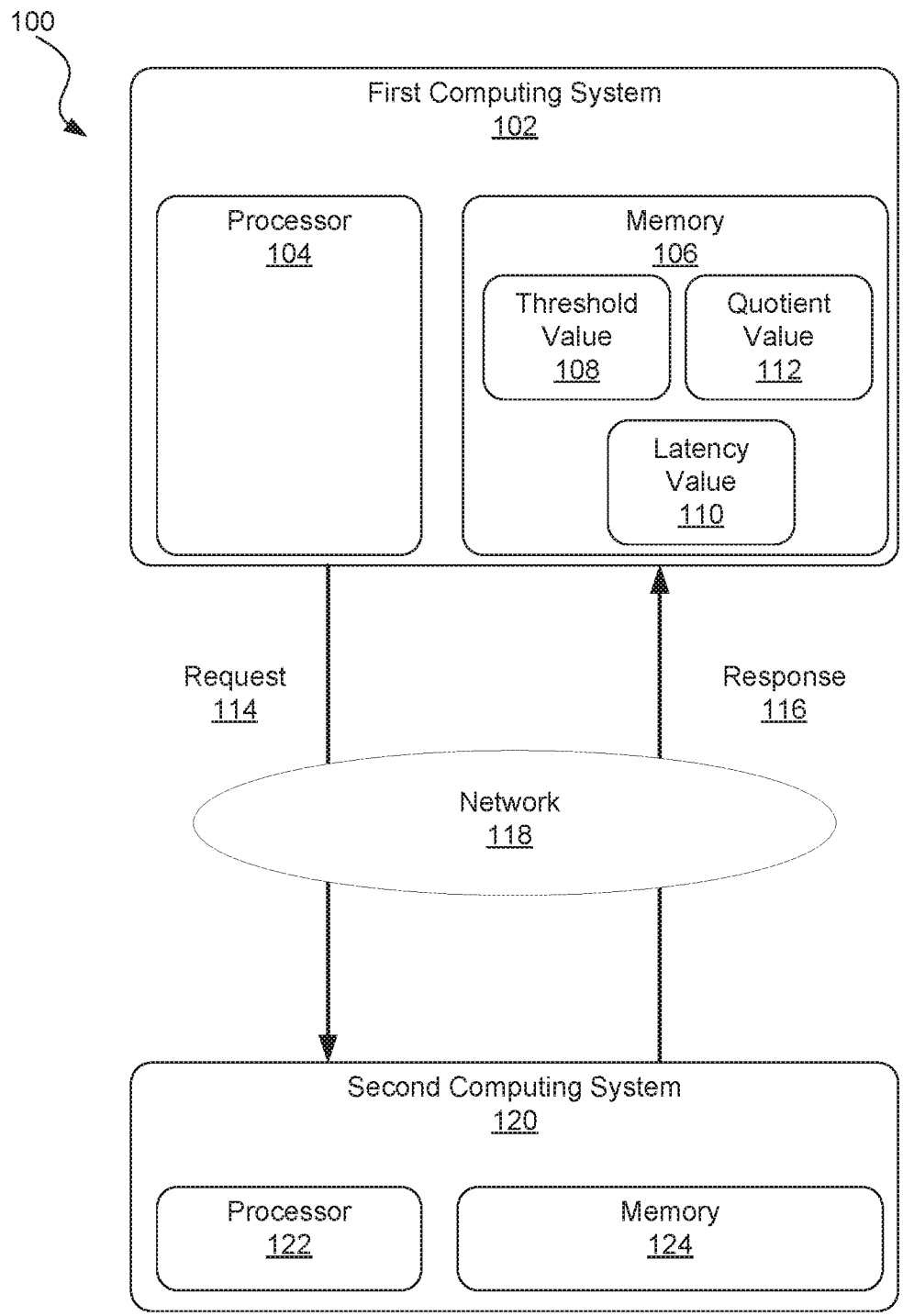
FIG. 1 is a diagram showing an illustrative system involving a first computing system and a second computing system, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to maintain security in a wireless network. Transmission of data in a wireless network involves a first computing device and at least one other second computing device that may communicate with the first computing device over the wireless network. It is important to determine whether the second computing device is a legitimate user of the network or an attacker attempting to gain unauthorized access to the network. In some situations, the second computing device (the attacker's device) is not near the first computing device, as would be expected. Instead, the attacker's device may be utilizing range extension techniques to attempt to gain access to a network even though the device is outside the network's normal range of operation.

Various computing systems use encryption technology that encrypts data to be stored in memory, but such computing systems are still vulnerable to range extension techniques. Thus, even if the data is encrypted, it is incredibly challenging to be able to perceive whether a computing system is an attacker. Therefore, a need exists to be able to prevent wireless systems from range extension techniques of attackers.

For example, if an attacker wishes to capture encrypted data, and a wired network is required, the attacker would typically have to break into a building and plug into the network. Unfortunately, if the network is wireless, the attacker can use range extension techniques in order to gain access to the wireless network outside of its typical range. Thus, a need exists to prevent such an attack. An example solution is to include the latency measurement between the system that is wishing to gain access, and the system of which access is being requested. For example, while range extension attacks can extend the range of the wireless network, this will generally introduce latency. As a result, by using the method and system as discussed below, latencies above a predetermined set latency threshold will produce different results than those below the predetermined set latency. It may be desirable to determine the latency of a request and response pair between two wireless computing systems, and then perform several measurements in order to determine if the latency is above a threshold value, and thus, determine that the system wishing to gain access to the system is actually within the normal range of the network or outside the normal range of the network.

By way of further example, it may be desirable to determine a minimum latency threshold, and subtract the minimum latency threshold from the latency of the request/response pair before the rest of the calculations are performed. Once the latency of the request/response pair is determined, and the minimum latency threshold is optionally subtracted from the latency, the result is divided by the set threshold value, resulting in a quotient. By way of further example, after the division occurs, the quotient is then ready to use in order to determine whether to allow secure communications between the computing systems. For example, if the quotient is less than one, the computing system requesting access is then determined to be within range of the computing system that access is being requested of, and as a result, is determined to not be an attacker. By way of further example, if the quotient is greater than or equal to one, the computing system requesting access is then determined to not be within an acceptable range of the computing system that access is being requested of, and as a result, is determined to be an attacker.

FIG. 1 is a diagram showing an illustrative system 100 involving a first computing system 102 and a second computing system 120 that communicate via network 118. According to the present example, the first computing system 102 includes hardware such as a processor 104 and a memory 106. Additionally, the second computing system 120 includes a processor 122 and a memory 124.

The first computing system 102 may be, for example, a desktop computer, a tablet computer, or a smart phone. The first computing system 102 may include a processor 104, which may be a hardware processor (such as a central processing unit (CPU) or a graphics processing unit (GPU)) that may be programmed to execute software applications. Additionally, for example, the processor 104 may represent one or more general-purpose processing devices such as a microprocessor, central processing unit, or the like. By way of further example, the processor 104 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 104 may also be one or more special-purpose processing devices such as an application specific integrated circuit (ASIC), a field programmable gate array (FPGA), a digital signal processor (DSP), network processor, or the like. The processor 104 is configured to execute instructions for performing the operations and steps discussed herein.

The memory 106 refers to the working memory of the first computing system 102. Working memory is typically Random Access Memory (RAM) and is designed for speed. Working memory is often a volatile form of memory, meaning that it loses its data when power is no longer supplied. The first computing system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The memory 106 may designate various blocks of memory for use by the first computing system 102. These blocks of memory may be ranges of physical memory addresses or virtual memory addresses.

The memory 106 may include a threshold value 108, a latency value 110, and a quotient value 112. The threshold value 108 may be set based on expected latency values within a predefined range of the network. For example, the threshold value 108 may be representative of the expected latency between the first computing system 102 and the second computing system 120 if such computing systems were on opposite sides of a predefined range of the network 118. The threshold value 108 may be determined through a variety of means. For example, the threshold value may be based on collected historical data of request/response pairs between devices that are known to be within the predefined range of the wireless network.

The predefined range of the network 118 may be defined based on the needs of the network. For example, if the network 118 is intended to provide a wireless network to a particular building, then the predefined range would cover that building and not extend far beyond that building. The network 118 may be designed to cover several building such as on a corporate or academic campus.

The latency value 110 may be the latency of a request 114 and a response 116 to the request 114. The request 114 may be sent from the first computing system 102 over the network 118, and to the second computing system 120. The response 116 may be sent from the second computing system 120 over the network 118, and to the first computing system 102. In some examples, the latency value 110 may be divided by two in order to determine the average latency of a one-way trip between the first computing system 102 and the second computing system 120. In such cases the threshold value 108 may be set based on the expected one-way trip latency rather than a round-trip latency.

As will be explained in more detail below, the latency value 110 may be compared with the threshold latency value to determine whether the second computing system is outside the predefined range of the network 118. In some examples, such comparison may be done by dividing the latency value 110 by the threshold value 108, resulting in the quotient value 112.

The second computing system 120 may be computing systems including, for example, a computer, a tablet computer, a smart phone, or may operate in the capacity of a server or a client machine in a client-server network environment, or as a peer machine in a peer-to-peer (or distributed) network environment. The second computing system 120 may include a processor 122, which may be a hardware processor (such as a central processing unit (CPU) or a graphics processing unit (GPU)) that may be programmed to execute software applications. Additionally, for example, the processor 122 may represent one or more general-purpose processing devices such as a microprocessor, central processing unit, or the like. By way of further example, the processor 122 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 122 may also be one or more special-purpose processing devices such as an application specific integrated circuit (ASIC), a field programmable gate array (FPGA), a digital signal processor (DSP), network processor, or the like. The processor 122 is configured to execute instructions for performing the operations and steps discussed herein.

The memory 124 refers to the working memory of the second computing system 120. Working memory is typically Random Access Memory (RAM) and is designed for speed. Working memory is often a volatile form of memory, meaning that it loses its data when power is no longer supplied. The second computing system 120 may, however, have other forms of memory available such as solid state drives, Network-Attached Storage (NAS) drives, Redundant Array of Independent Disks (RAID) drives, and other non-volatile storage devices. The various types of memory may store information in the form of software and data. The memory 124 may designate various blocks of memory for use by the second computing system 120. These blocks of memory may be ranges of physical memory addresses or virtual memory addresses.

The network 118 may connect the first computing system 102 and the second computing system 120. In some examples, the network 118 and/or one or more portions thereof may be designed to work on any specific architecture. In some examples, one or portions of the network 118 may be executed on a single computer, local area networks, client-server networks, wide area networks, internets, handheld and other portable and wireless devices and networks. For example, the network 118 may be a wireless connection, a LAN, an intranet, an extranet. The network 118 may allow for communications between the first computing system 102 and the second computing system 120. In some circumstances, as will be described below, communications between the first computing system 102 and the second computing system 120 may be disallowed over the network.

Figure 2:
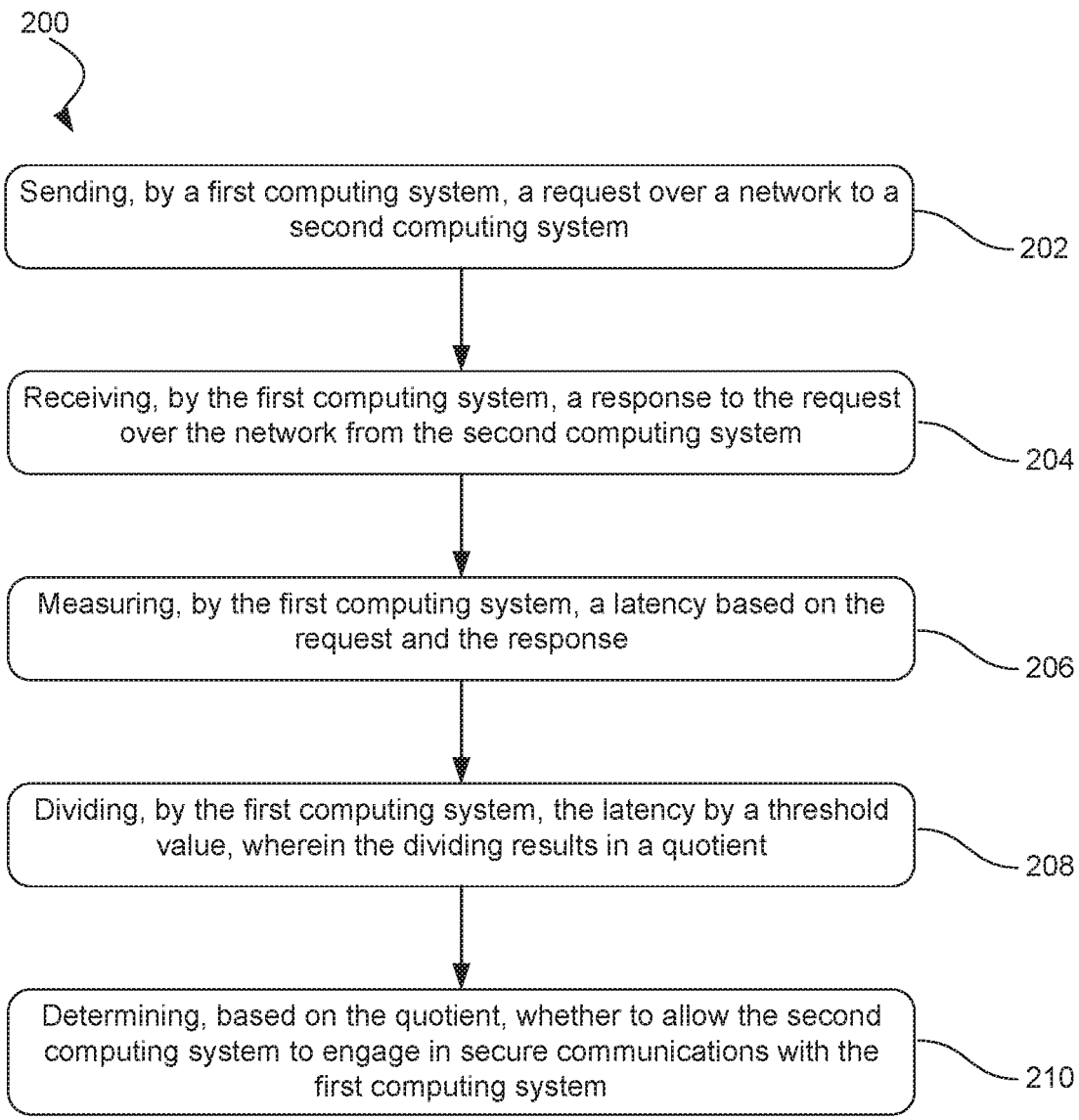
FIG. 2 is a diagram showing an illustrative method for determining whether to allow a first computing system to engage in secure communications with a second computing system based on a latency, according to one example of principles described herein.

FIG. 2 is a diagram showing an illustrative method 200 for determining whether to allow a first computing system to engage in secure communications with a second computing system based on a measured latency value. According to the present example, the method starts at step 202, in which the first computing system (e.g., 102, FIG. 1) sends a request (e.g., 114, FIG. 1) over a network to a second computing system (e.g., 120, FIG. 1). For example, the request may be a request for information from the second computing system, a request for the identification of the second computing system, or any other type of request.

At step 204, the first computing system receives a response to the request over the network from the second computing system. For example, the response may include the information the first computing system was requesting, the identification of the second computing system, or any other type of information. The response may be a confirmation that the second computing system received the request of the first computing system. By way of further example, once the first computing system receives the response, the first computing system may store the response. In some cases, it may be the case that a response to the request is not sent from the second computing device. In such a case, the first computing system will not send additional requests to the second computing system, without first receiving a response from the second computing system. In some examples, it may be the case that the second computing system did not receive the request from the first computing system. In such a case, the first computing system may be allowed to send an additional request to the second computing system. In other cases, it may be the case that the network did not send the response to the first computing system. In such a case, the network or the second computing system may resend the response to the first computing system.

At step 206, the first computing system measures a latency based on the request and the response. For example, the first computing system may measure the latency of the request and the response, and the first computing system may divide the latency by two, in order to determine the average latency of a one-way trip between the first and second computing systems. The measured latency, divided by two, may then be stored as a latency value (e.g., 110, FIG. 1).

At step 208, the first computing system divides the latency value by a threshold value (e.g., 108, FIG. 1), where the dividing results in a quotient (e.g., 112). For example, the threshold value may be a set string value that is representative of the average latency the system would expect to have, if the first computing system is near the second computing system. By way of further example, the threshold value may be part of an expected latency range, where the threshold value is a minimum or a maximum of the expected latency range.

At step 210, it is determined, based on the quotient, whether to allow the second computing system to engage in secure communications with the first computing system. For example, if it is determined that the quotient is greater than or equal to one, further communications between the first computing system and the second computing system may be prevented. Further, if it is determined that the quotient is less than one, the second computing system may be allowed to engage in secure communications with the first computing system.

Figure 3:
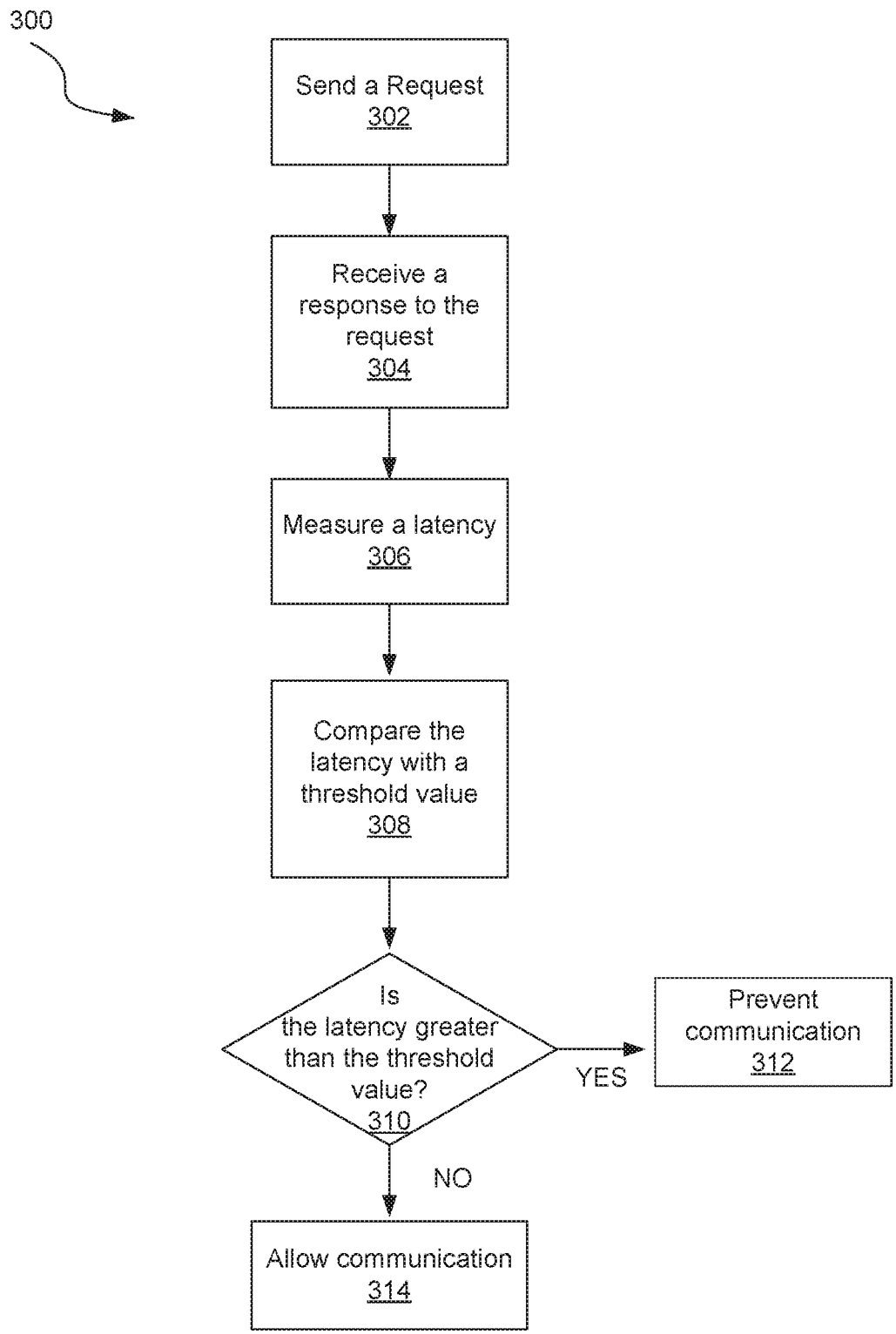
FIG. 3 is a flowchart showing an illustrative method for comparing a latency with a threshold value and determining whether to allow or prevent communications, according to one example of principles described herein.

FIG. 3 is a flowchart showing an illustrative method 300 for comparing a latency with a threshold value and determining whether to allow or prevent communications. According to the present example, the method starts at step 302, in which the first computing system sends a request to a second computing system over a network. The first computing system may try to send additional requests and/or communications after the initial request, but the network may prevent the additional requests and/or communications until it is determined whether additional secure communications are allowed. Additionally, the first computing system may receive a confirmation from the network or the second computing system that the request was received by the second computing system.

At step 304, the first computing system receives a response to the request, which is sent by the second computing system. For example, the response may also be sent over the network from the second computing system to the first computing system. Additionally, the second computing system may receive a confirmation from the network that the response was sent to or received by the first computing system.

At step 306, the first computing system measures a latency, which is based on the latency of the request and response. The total latency of both the response and the request may, for example, be divided by two in order to determine the latency of just the request.

At step 308, the latency is compared with a threshold value. The threshold value may be determined, for example, based on expected latency values within a predefined range of the network. Moreover, the threshold value may be the maximum latency that would be expected of the latency between two computing systems within the predefined range of the wireless network.

At step 310, a determination of whether the latency is greater than the threshold value is made. If it is determined that the latency is greater than the threshold value, then the method proceeds to step 312, where additional communication is prevented. For example, if the latency is greater than the threshold and the first computing system attempts to send an additional request to the second computing system, the network may prevent the request from being sent to the second computing system.

If, however, it is determined that the latency is less than the threshold value, then the method proceeds to step 314, where additional communication is allowed. For example, if the latency is less than the threshold value, and the first computing system attempts to send an additional communication to the second computing system, the network will allow for the additional communication to be received by the second computing system, as well as any other communications that the first computing system sends. Additionally, for example, if the latency is less than the threshold value, the second computing system is allowed to engage in communications with the first computing system.

Figure 4:
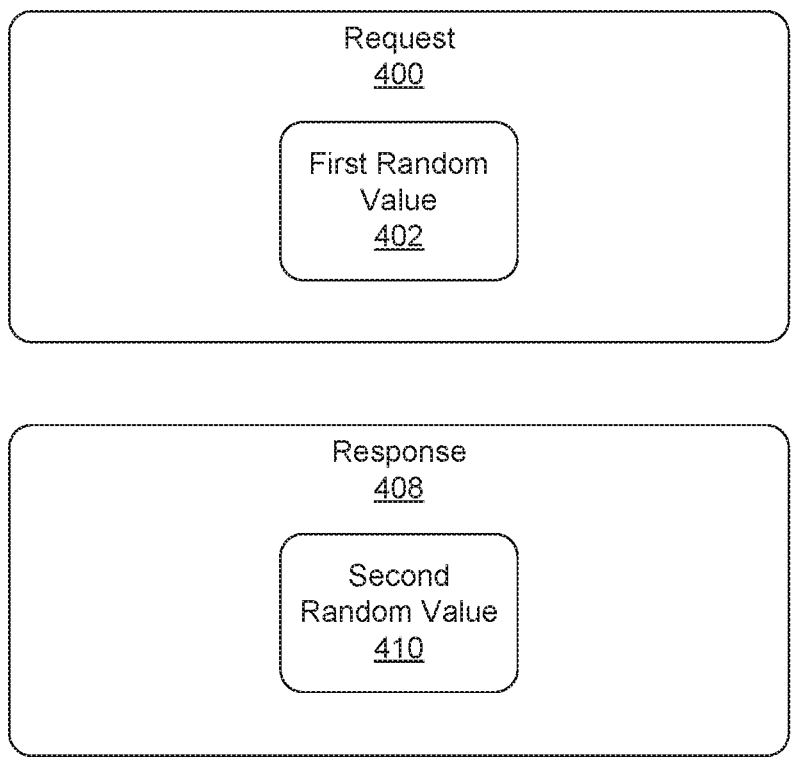
FIG. 4 is a diagram showing an illustrative system including the contents for a request and a response, according to one example of principles described herein.

FIG. 4 is a diagram showing an illustrative system including the contents for a request and a response. The system may include a request 400 and a response 408. The request includes a first random value 402. The first random value 402 may be a set of randomly generated alphanumeric characters. Introducing a random value prevents a situation where an attacker knows the expected latency values and creates a false response packet that tricks the first computing system into measuring a false latency value that is less than the real latency value. The response 408 may include a second random value 410. The second random value 410 may be based on the first random value 402. For example, a legitimate device of the network may be provided with a function that is applied to the first random value 402 to generate the second random value 410. The first computing system can then check the second random value 410 in the response 408 to ensure that the packet has not been manipulated to provide a false latency measurement.

Figure 5:
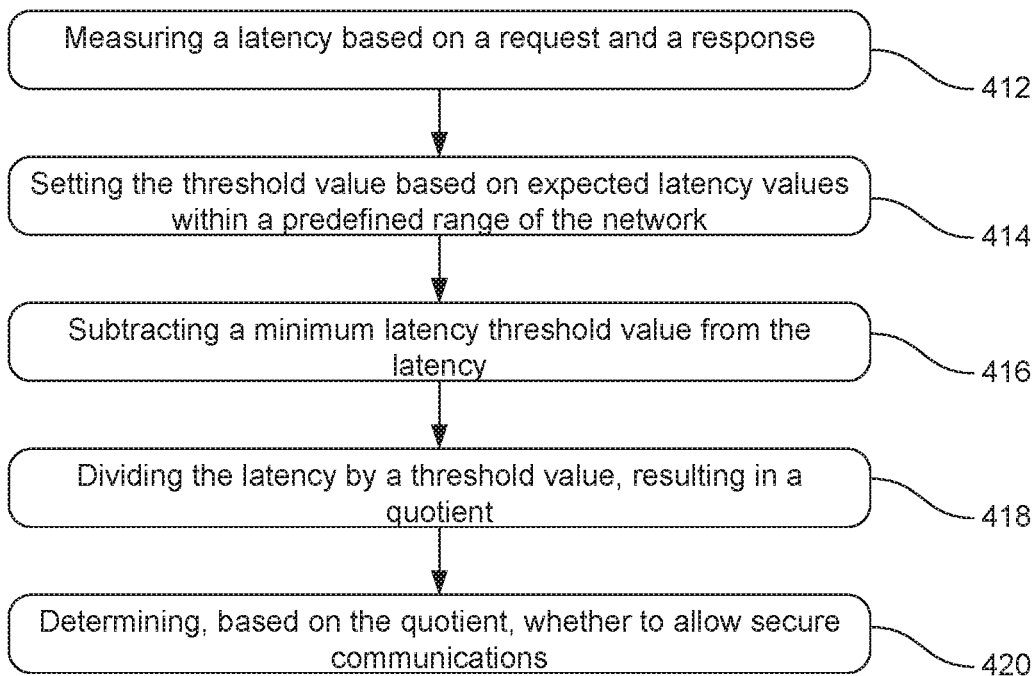
FIG. 5 is a flowchart showing an illustrative method for determining, based on the quotient, whether to allow secure communications, where a minimum latency threshold value is subtracted from the latency, according to one example of principles described herein.

FIG. 5 is a flowchart showing an illustrative method for determining, based on the quotient, whether to allow secure communications, where a minimum latency threshold value is subtracted from the latency. According to the present example, the method starts at step 412, where a latency based on a request and a response is measured. The measured latency based on the request and response may be divided by two, in order to indicate the latency of one direction, instead of the round-trip of both the request and the response.

At step 414, the threshold value is set based on expected latency values within a predefined range of the network. The threshold value may be the maximum of the predefined range of the network, or, for example, the threshold value may be the minimum of the predefined range of the network. The threshold value may be an alphanumerical string value.

At step 416, a minimum latency threshold value is subtracted from the latency. The subtraction of the minimum latency threshold value from the latency results in an updated latency value. After the minimum latency threshold value is subtracted from the latency, at step 418, the latency is then divided by a threshold value, which results in a quotient.

At step 420, it is determined, based on the quotient, whether to allow secure communications between a first computing system and a second computing system. For example, if the quotient is less than a certain value, such as one, the secure communications between a first computing system and a second computing system may be allowed. By way of further example, if the quotient is more than a certain value, such as one, the secure communications between the first computing system and the second computing system may not be allowed.

Figure 6A:
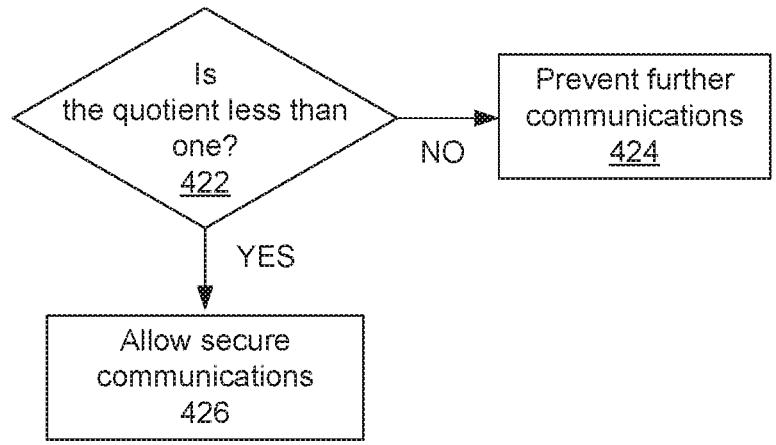
FIG. 6a is a flowchart showing an illustrative method for determining whether a quotient is less than one, according to one example of principles described herein.

FIG. 6a is a flowchart showing an illustrative method for determining whether a quotient is less than one. At step 422, the determination is made regarding whether the quotient is less than one. After the determination is made, if the quotient is not less than one, the method proceeds to step 424, where further communications between two computing systems are prevented. Additionally, after the determination is made, if the quotient is less than one, the method proceeds to step 426, where further communications between two computing systems are allowed.

Figure 6B:
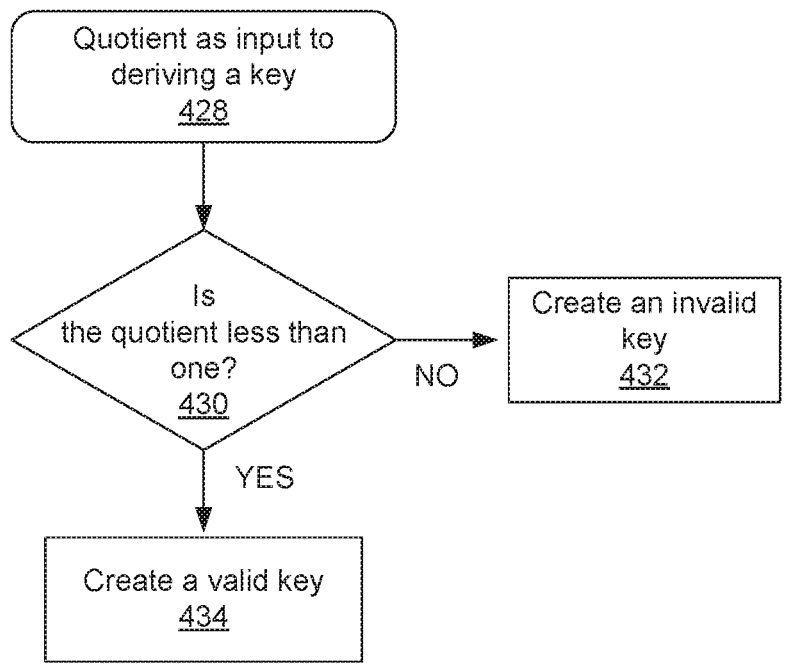
FIG. 6b is a flowchart showing an illustrative method for whether to create a valid or invalid key based on whether a quotient is less than one, according to one example of principles described herein.

FIG. 6b is a flowchart showing an illustrative method for whether to create a valid or invalid key based on whether a quotient is less than one. At step 428, the quotient is used as an input to key generation. Specifically, the quotient is used as an input to deriving the key for encrypting further communications between the first computing system and the second computing system. At step 430, a determination is made regarding whether the quotient is less than one. If the quotient is not less than one, the method proceeds to step 432, where an invalid key is created. In other words, the zero value of the quotient causes the key generation function to produce an illegitimate key. Thus, when the second computing system tries communicating with that key, it will not be able to access the network.

However, if the quotient is less than one, the method proceeds to step 434, where a valid key is created. When the second computing system tries to use the valid key, it will work as it should to allow the second computing system access to the network.

Some examples of processing systems described herein may include non-transient, tangible, machine readable media that include executable instructions that when run by one or more processors (e.g., processor 104) may cause the one or more processors to perform the processes of method 200 as described above. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
sending, by a first computing system, a request over a network to a second computing system;

receiving, by the first computing system, a response to the request over the network from the second computing system;

measuring, by the first computing system, a latency based on the request and the response;

dividing, by the first computing system, the latency by a threshold value, wherein the dividing results in a quotient; and determining, based on the quotient, whether to allow the second computing system to engage in secure communications with the first computing system.

2. The method of claim 1, further comprising, subtracting, by the first computing system, a minimum latency threshold value from the latency before the dividing.

3. The method of claim 1, further comprising, using the quotient as an input to deriving a key for encrypting further communications between the first computing system and the second computing system.

4. The method of claim 3, wherein deriving the key is such that a quotient value greater than or equal to one creates an invalid key.

5. The method of claim 3, wherein deriving the key is such that a quotient value less than one creates a valid key.

6. The method of claim 1, wherein the threshold value is set based on expected latency values within a predefined range of the network.

7. The method of claim 1, further comprising, preventing further communication between the first computing system and the second computing system in response to determining that the quotient being greater than or equal to one.

8. The method of claim 1, wherein the second computing system is allowed to engage in secure communications with the first computing system in response to determining that the quotient is less than one.

9. The method of claim 1, wherein the request includes a first random value and the response includes a second random value.

10. The method of claim 9, wherein the second random value is based on the first random value.

11. The method of claim 1, wherein the network is a wireless network.

12. A system comprising:
a processor; and
a memory comprising machine readable instructions that when executed by the processor, cause the system to:
send, with a first computing system, a request over a network to a second computing system;
receive, with the first computing system, a response to the request over the network from the second computing system;
measure, with the first computing system, a latency based on the request and the response;
divide, with the first computing system, the latency by a threshold value, wherein the dividing results in a quotient; and
determine, based on the quotient, whether to allow the second computing system to engage in secure communications with the first computing system.

13. The system of claim 12, wherein the machine readable instructions further cause the system to subtract, by the first computing system, a minimum latency threshold value from the latency before the dividing.

14. The system of claim 12, wherein the machine readable instructions further cause the system to use the quotient as an input to deriving a key for encrypting further communications between the first computing system and the second computing system.

15. The system of claim 12, wherein the machine readable instructions further cause the system to prevent further communication between the first computing system and the second computing system in response to determining that the quotient being greater than or equal to one.

16. The system of claim 12, wherein the second computing system is allowed to engage in secure communications with the first computing system in response to determining that the quotient is less than one.

17. A method comprising:
with a first computing system, measuring a latency value of a communication over a wireless network between the first computing system and a second computing system;
subtracting, by the second computing system, a minimum latency threshold value from the latency value before the comparing;
comparing the latency value with a threshold value that is based on a defined range of the wireless network; and
based on the comparing, determining whether to allow the second computing system to engage in secure communications with the first computing system.

18. The method of claim 17, further comprising, preventing further communication between the second computing system and the first computing system in response to determining that the latency value is greater than the threshold value.

19. The method of claim 17, wherein the first computing system is allowed to engage in secure communications with the second computing system in response to determining that the latency value is less than the threshold value.

* * * * *